Fig. 9

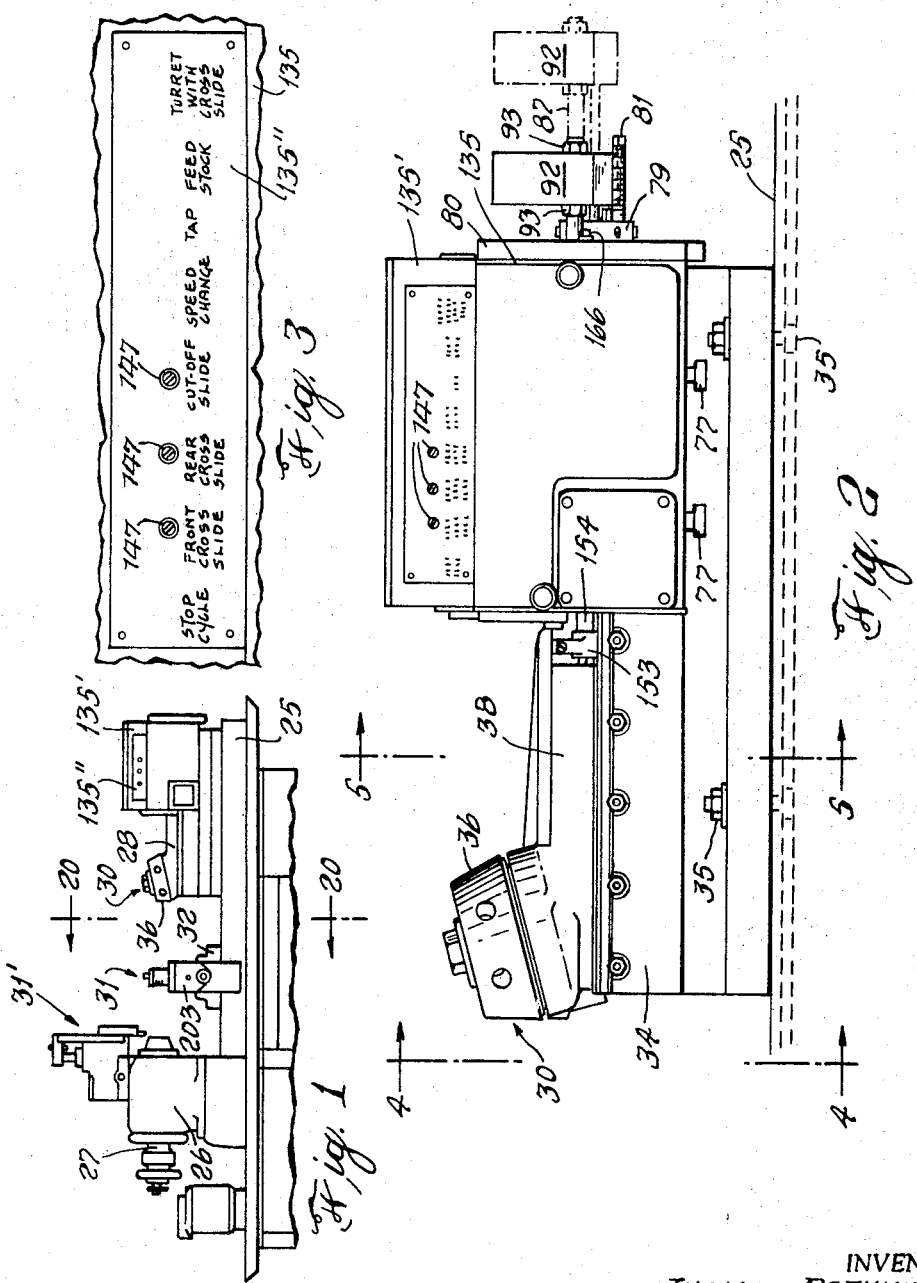

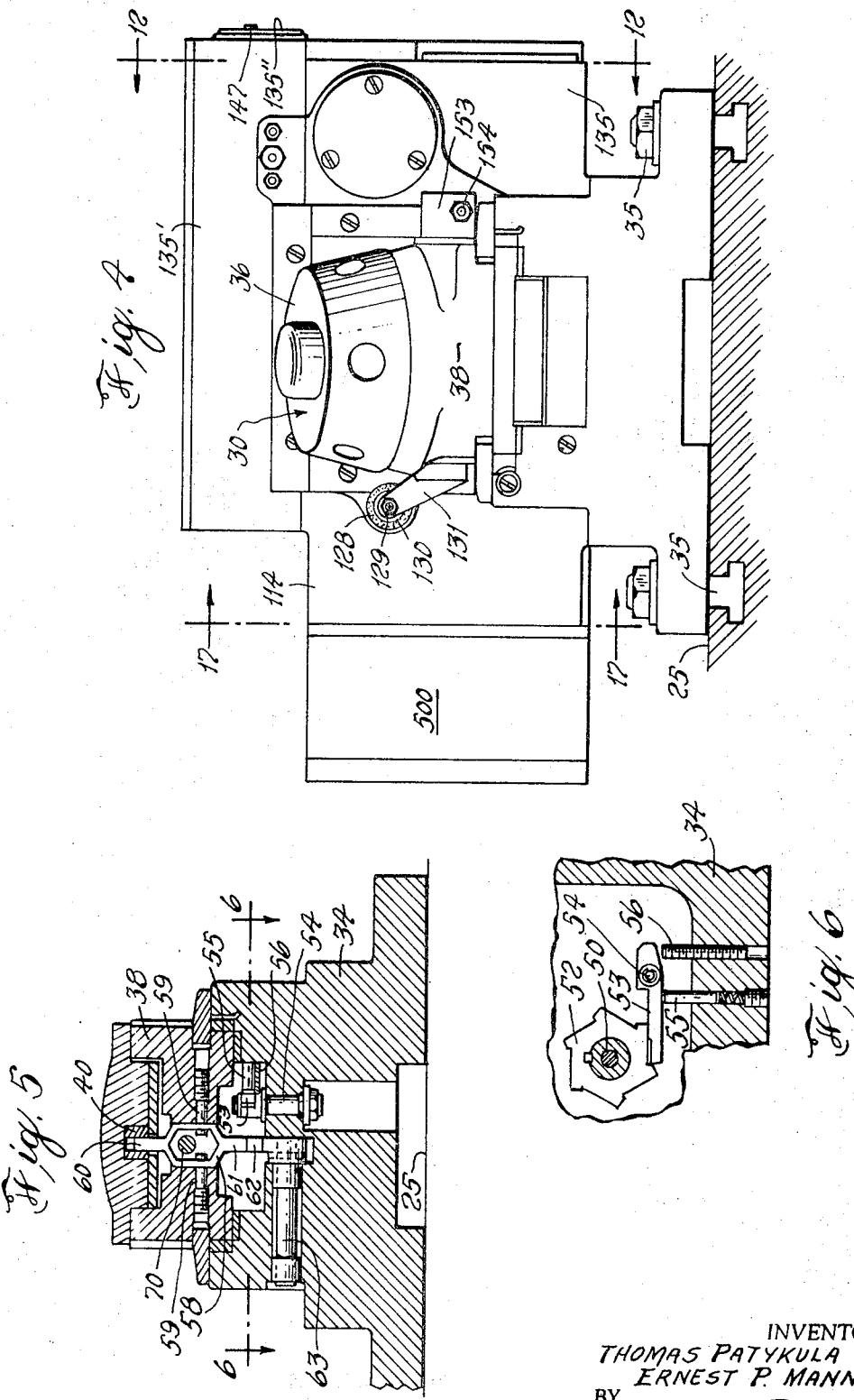

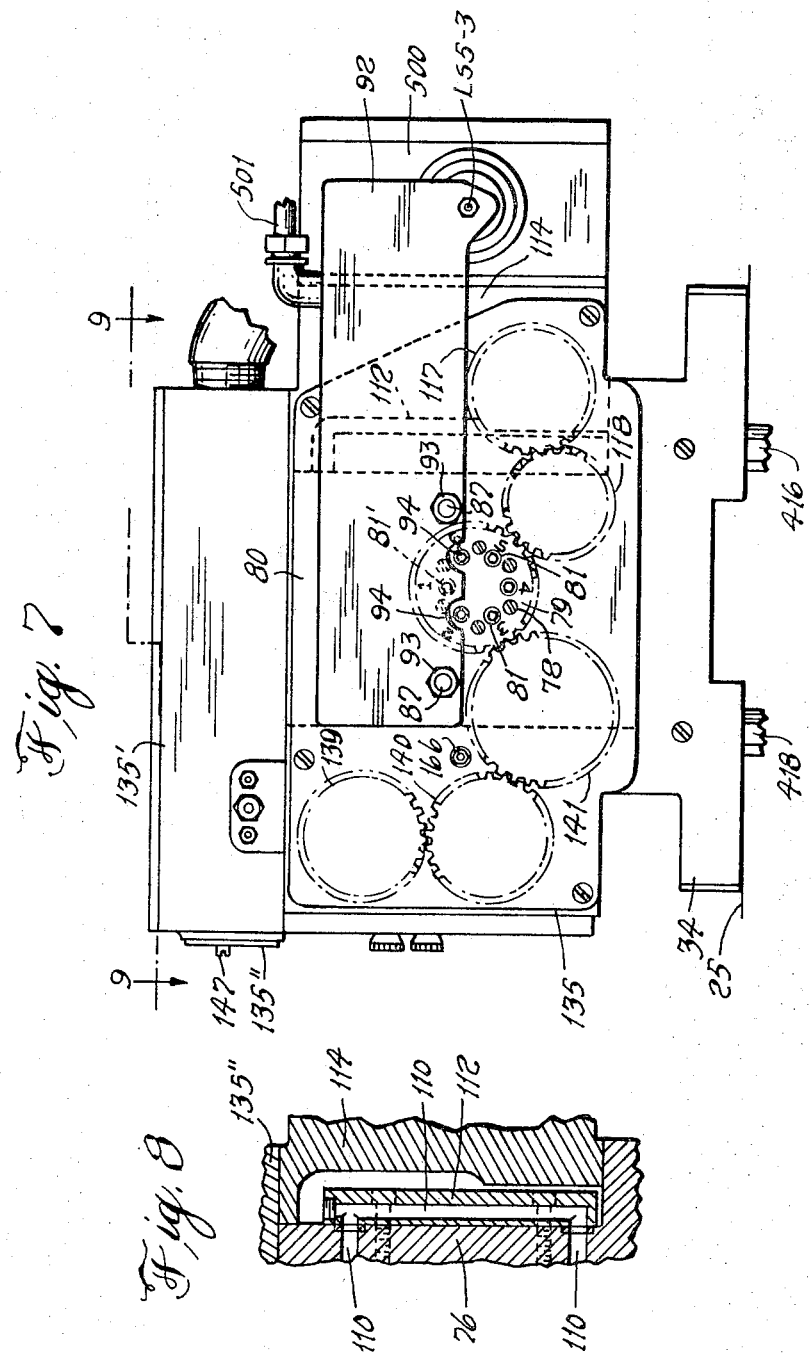

INVENTORS.
THOMAS PATYKULA
ERNEST P. MANN
BY
ATTORNEYS

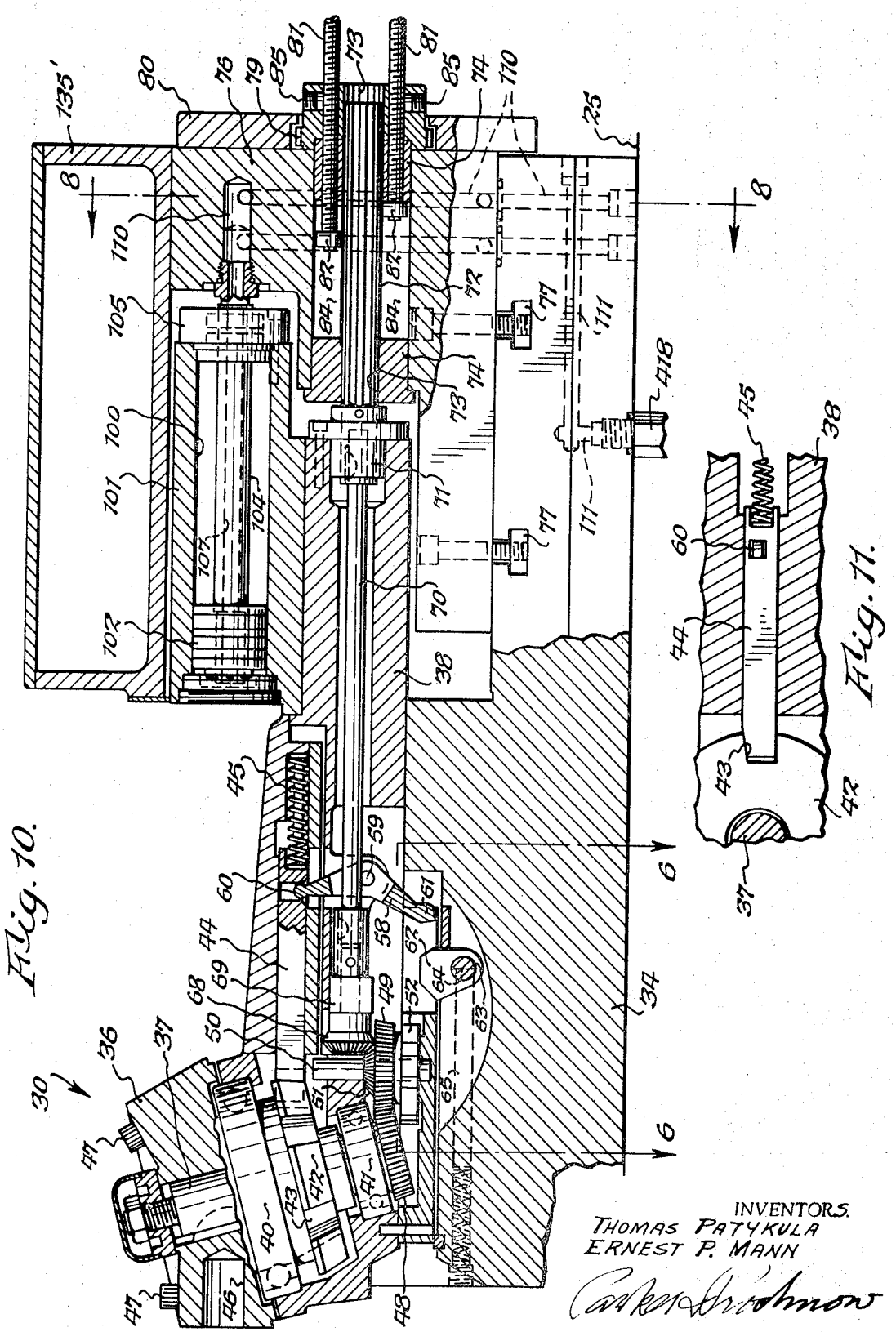

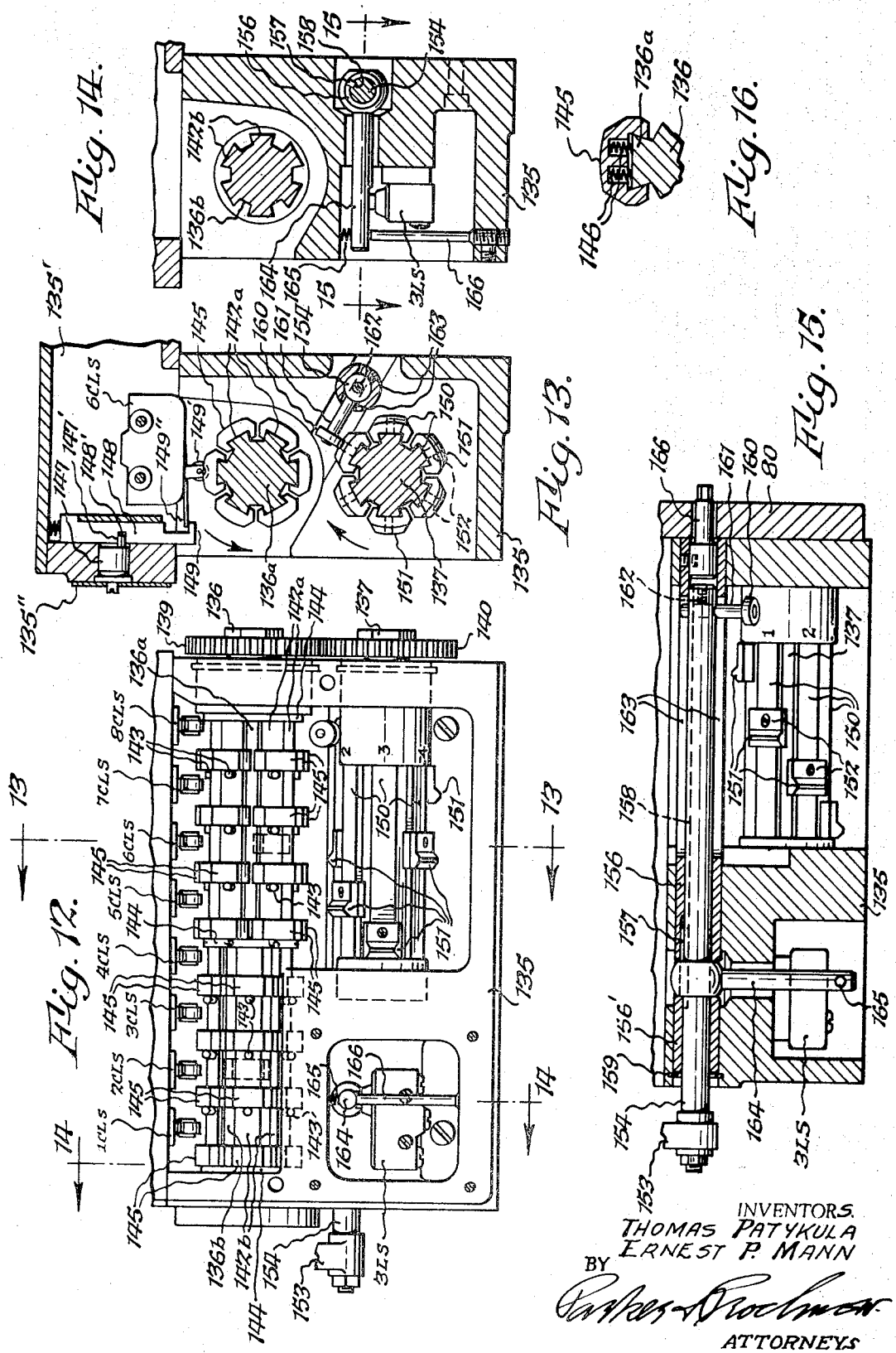

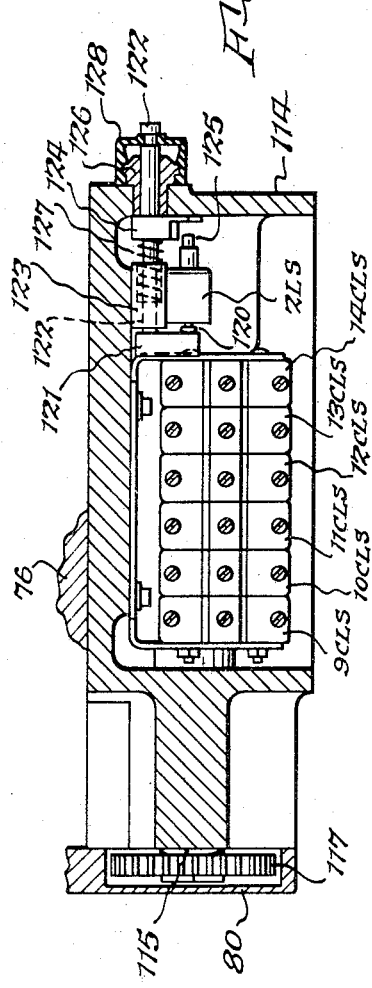
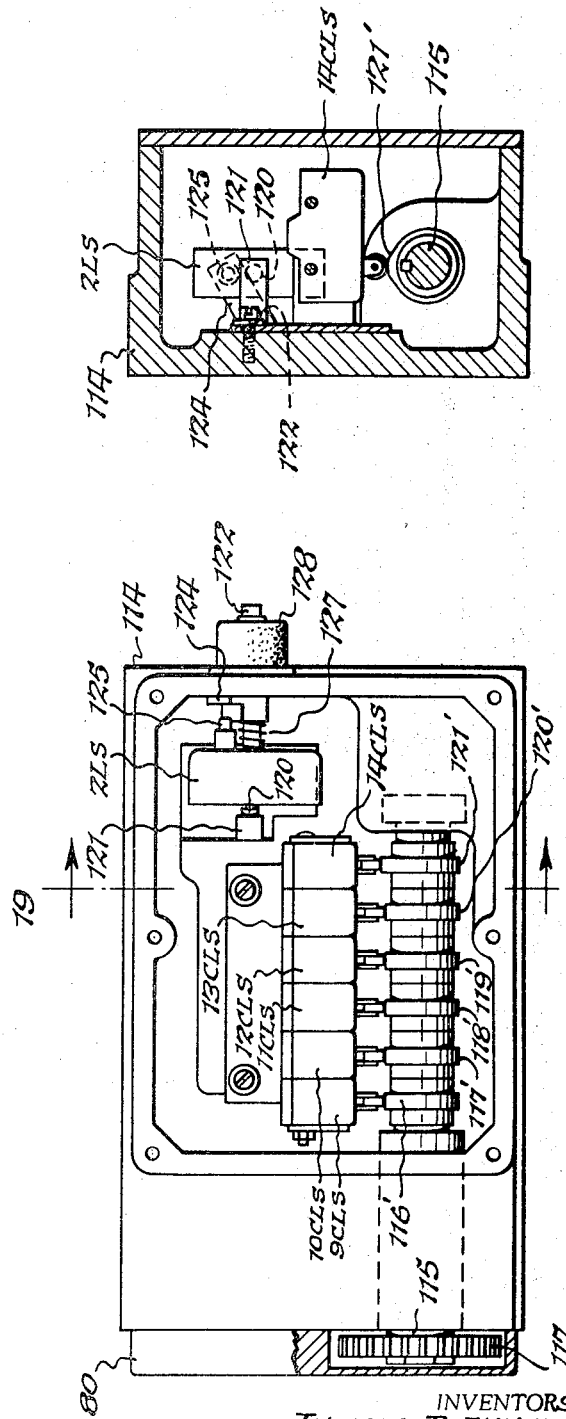

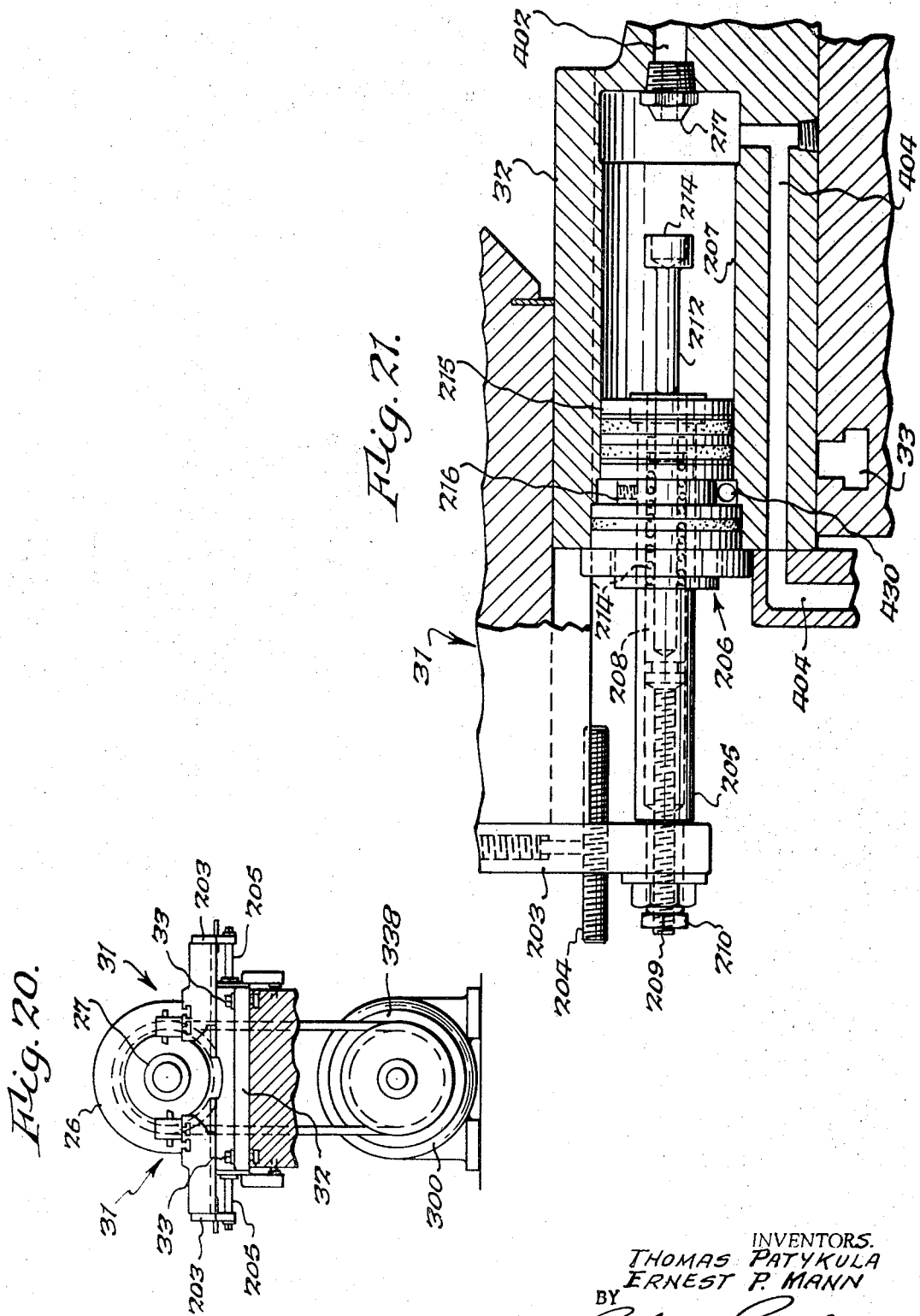

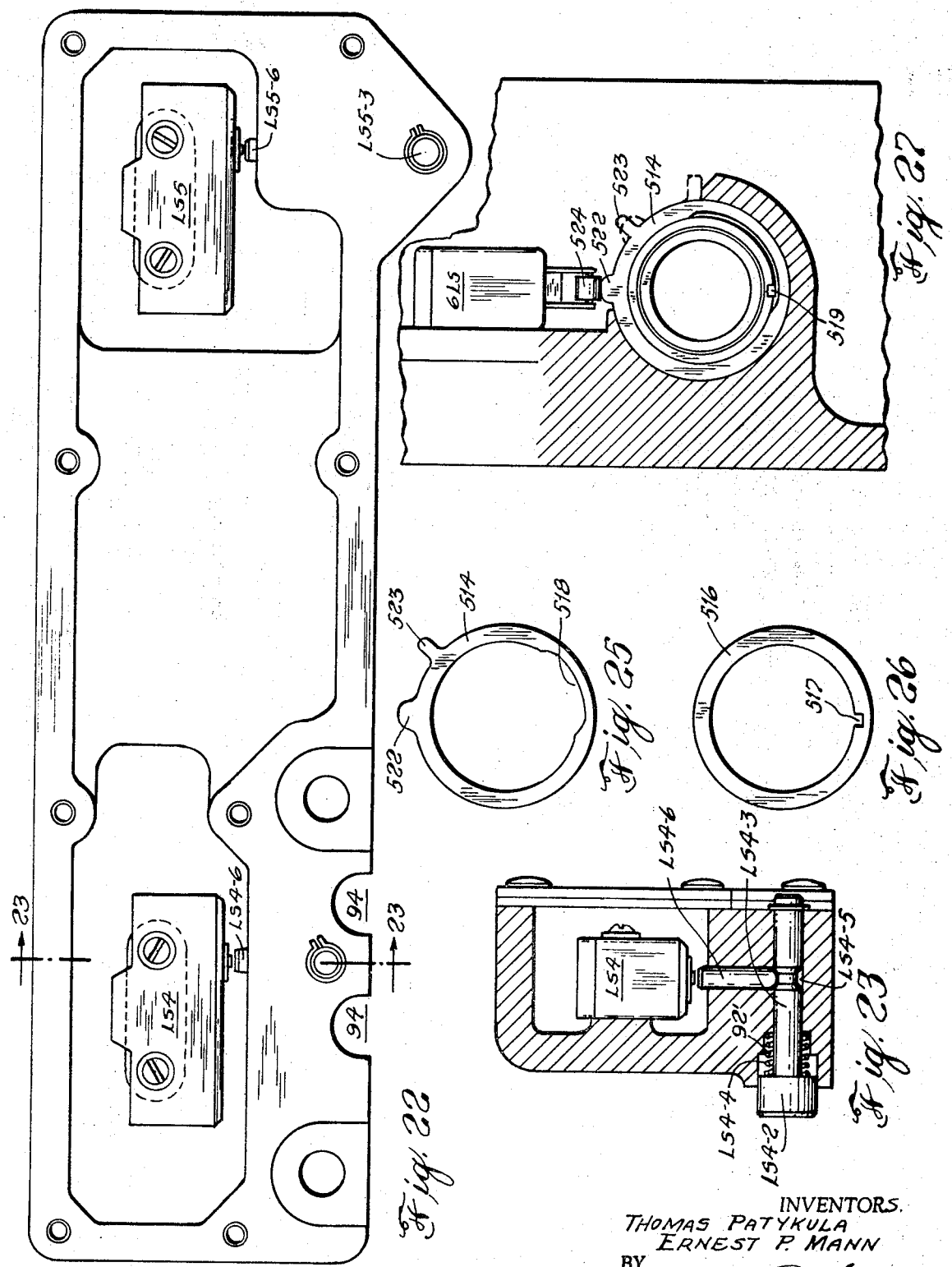

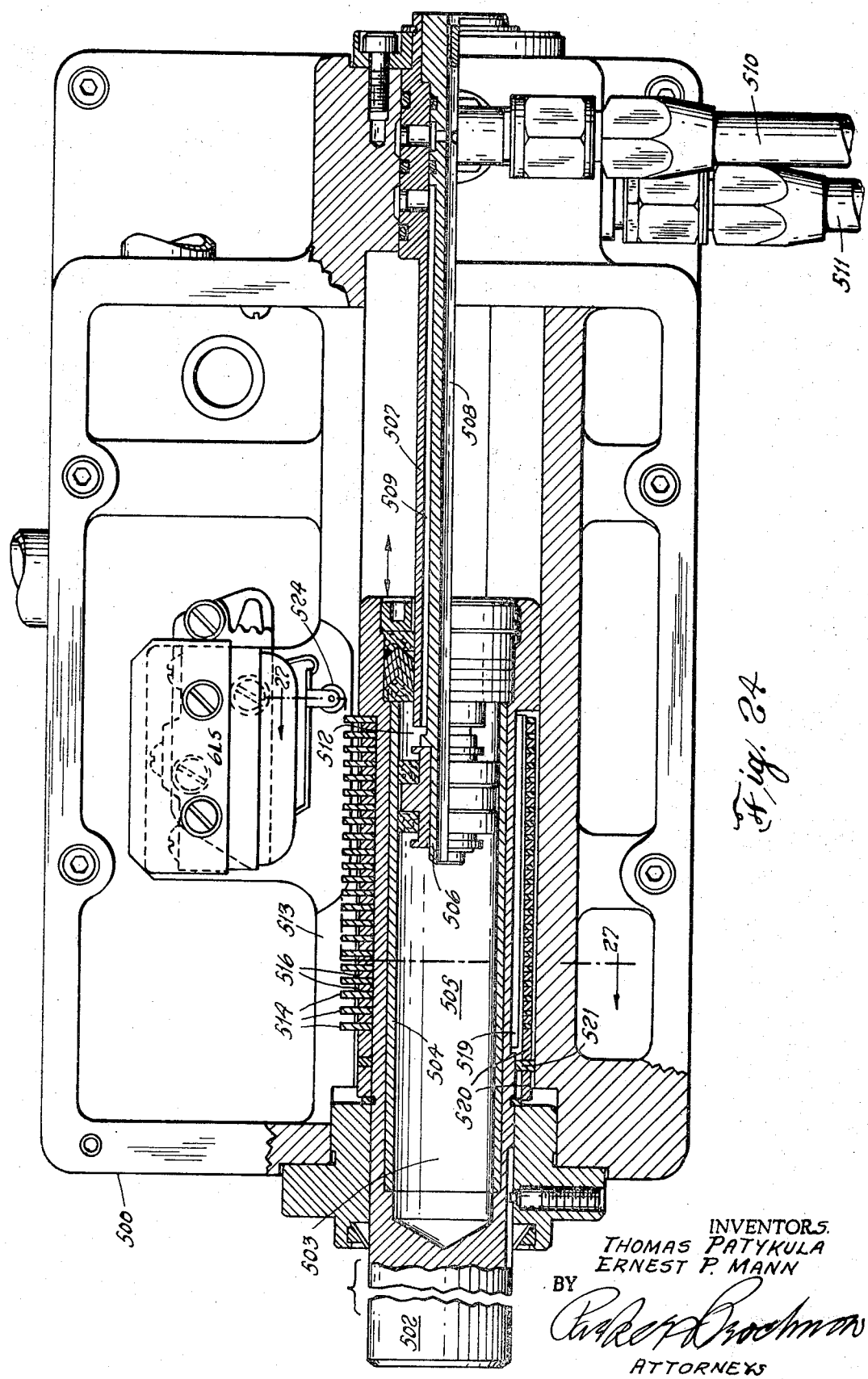

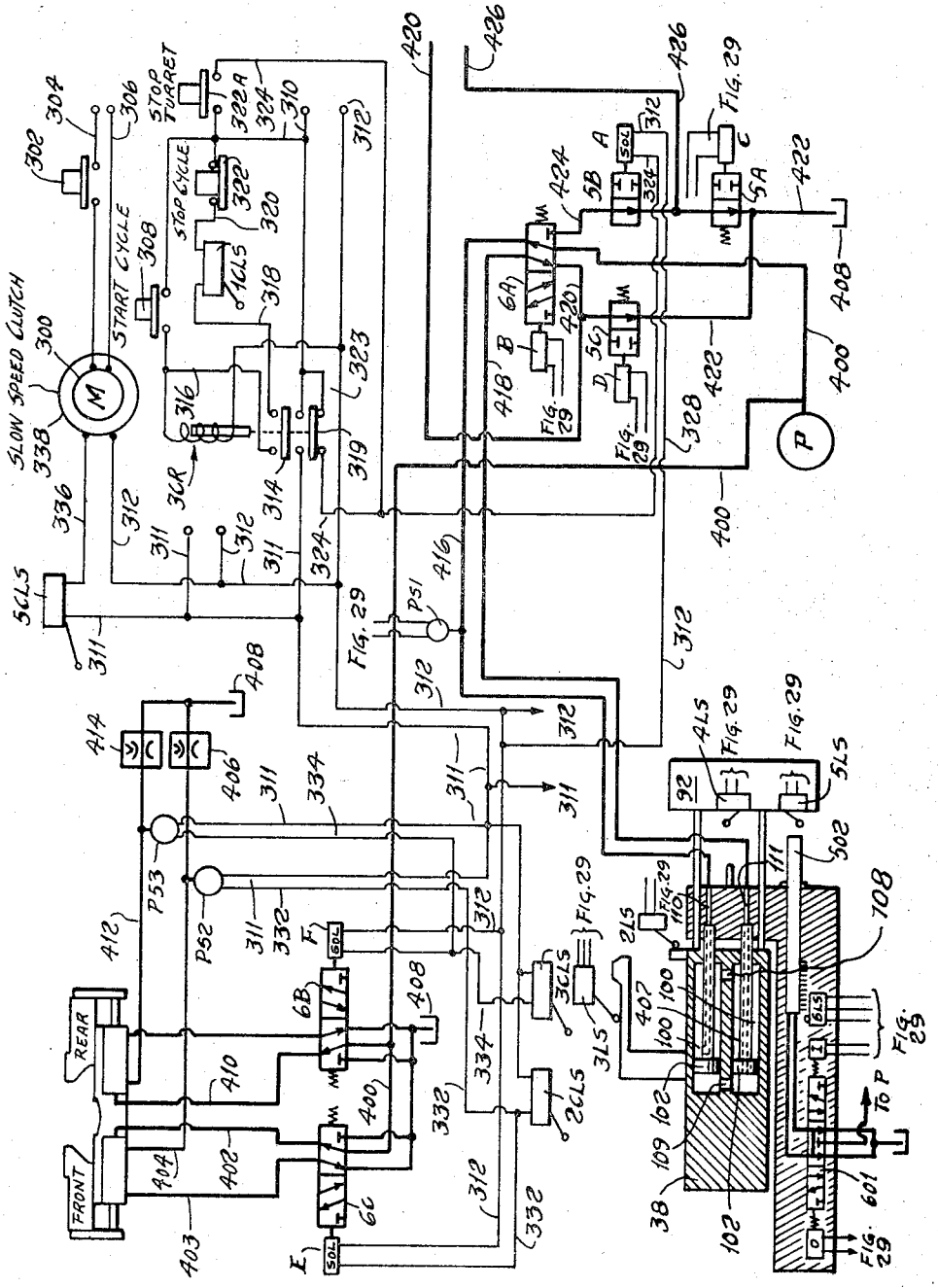

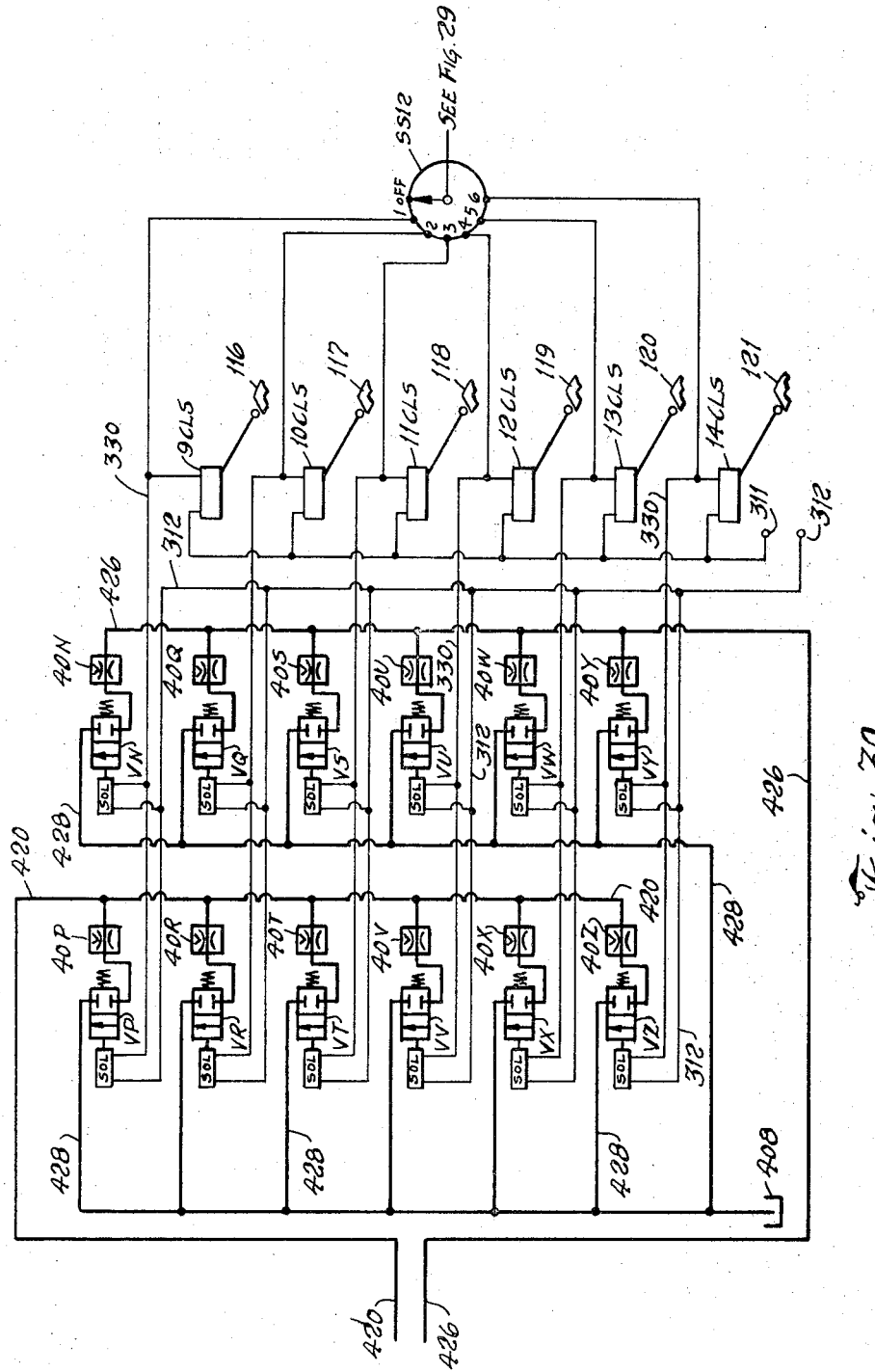

United States Patent Office 3,545,020
Patented Dec. 8, 1970

3,545,020
AUTOMATIC PROGRAMMED RECIPROCABLE CONTROL FOR MACHINE TOOLS
Thomas E. Patykula, Elmira, and Ernest P. Mann, Horseheads, N.Y., assignors to Hardinge Brothers, Inc., Elmira, N.Y.
Filed Sept. 13, 1968, Ser. No. 759,735
Int. Cl. B23g *1/00;* B23b *39/20, 39/10, 47/18*
U.S. Cl. 10—128
8 Claims

ABSTRACT OF THE DISCLOSURE

An improvement for an automatic machine whereby it may be programmed to operate in a selected reciprocating manner. The reciprocating device includes an extensible, hydraulically activated plunger carrying a series of activator rings operating a stationary switch and a pair of coacting switches mounted on a rear movable stop. Said switches electrically interconnected for controlling the reciprocating cycles of said machine.

BACKGROUND OF THE INVENTION

The present invention relates to hydraulically motivated machine tools which are automatically controlled by associated electrical circuitry and which will be guided to perform multiple cyclic operations. More particularly, this invention relates to an improvement in such controlled machines which improvement automatically programs them to operate in a selected reciprocating manner and to thereafter return them to their standard or normal functional operation.

DESCRIPTION OF THE PRIOR ART

Automatic machine tools presently available perform a multitude of complex operations through the use of relatively complex electrical and hydraulic circuitry. Attempts to include in this operation a reciprocating function have not only added to the complexity of the circuits but have also resulted in extremely bulky and unreliable machines. In addition, where a drilling function is contemplated, the reciprocation must be progressive and the drill removed from the work piece each time in order to clean it so that on each successively reciprocating motion the depth of movement must be varied as well as the retraction. Such preprogrammed controls as will perform the necessary operation have in the past been of necessity difficult to set up, program, and required an extremely skilled operator. The complexities are further compounded where a plurality of stations are to be indexed and the reciprocating function different for each of the stations. In general, the prior pre-programmed devices for reciprocating movement have not satisfactorily accomplished the basic criteria for present machines of reliability, simplicity, low cost and ease of operation.

SUMMARY OF THE INVENTION

The general purpose of this invention is to provide a reliable, simple, automatic preprogrammed control device for imparting a reciprocating operational function to machine tool mechanisms that has all the advantages of similarly employed prior art devices without any of the above-described disadvantages or limitations. To attain this, the present invention provides an electrically controlled, hydraulically operated, piston and an extensible plunger carried by a stationary portion of the machine. A series of adjustable actautor rings movable with said piston and plunger operate a forward movement and retraction of the machine. Another switch in contact with said plunger and movable with the machine controls the start of the forward movement after retraction and progressively and cyclically compresses the plunger to activate the limit switch. Additional electrical circuitry including other limit switches, and relays completes the programmed operation and permits normal operation of the machine at any selected indexed station desired, as well as interlocking for the various circuits, thus assuring reliability.

An object of this invention is to provide an inexpensive, reliable, simple, selectively programmed device for controlling and imparting reciprocatable motion to a machine tool mechanism which includes a plurality of indexed stations.

Another object is to provide an attachment or improvement for existing machine tools which will extend their capabilities to permit adjustable and preselectable reciprocating motion thereof at low cost and with a minimum of complexity.

Still another object of this invention is to provide a device for cyclically reciprocating a machine tool employing a system which is relatively simple in organization and may be directly incorporated into an existing machine such that an unskilled operator can setup, control, program and operate the machine.

Other objects and features of the invention will become apparent to those skilled in the art as the disclosure is made in the following description of a preferred embodiment of the invention, as illustrated in the accompanying drawings.

BRIEF DESCRIPTION OF THE DRAWINGS

In the accompanying drawings:
FIG. 1 is a side elevation of a typical machine tool to which the reciprocating control device of this invention has been applied.
FIG. 2 is an enlarged side elevation of the turret and a partial view of the reciprocating control structure.
FIG. 3 is an enlarged, fragmentary face view in part of the function dial covering the auxiliary function switches.
FIG. 4 is a front elevation of the turret assembly taken approximately along line 4—4 of FIG. 2.
FIG. 5 is a vertical, sectional view taken through the turret slide approximately along line 5—5 of FIG. 2.
FIG. 6 is a horizontal fragmentary, sectional view taken approximately along line 6—6 of FIG. 5.
FIG. 7 is a rear elevation of the turret programming housing and illustrating the main reciprocating unit and the stop switch assembly.
FIG. 8 is a fragmentary section of an oil passage taken approximately along line 8—8 of FIG. 10.
FIG. 9 is a top plan of the turret programming housing with part of the cover broken away and the reciprocating unit plunger and rear stop switch housing assembly.
FIG. 10 is a vertical, sectional view taken approximately along the center line axis of the turret and one of the actuating pistons and cylinder.
FIG. 11 is a horizontal fragmentary plan of the turret index plunger.
FIG. 12 is a fragmentary side view of the turret programming housing similar to FIG. 2 with the cover removed.
FIG. 13 is a fragmentary, vertical section taken approximately along line 13—13 of FIG. 12.
FIG. 14 is a fragmentary, vertical section taken approximately along line 14—14 of FIG. 12.
FIG. 15 is a fragmentary, horizontal section taken approximately along line 15—15 of FIG. 14.
FIG. 16 is an enlarged, fragmentary sectional detail of one of the side cams illustrated in FIG. 13.
FIG. 17 is a fragmentary, horizontal section of the feed switches on the back side of the turret housing.

FIG. 18 is a side elevation of the feed switches and their actuating cams viewed from the back side of the machine and having the cover removed.

FIG. 19 is a vertical, sectional view of the feed switches and cams taken approximately along 19—19 of FIG. 18.

FIG. 20 is a vertical, sectional view through the machine approximately along line 20—20 of FIG. 1 illustrating the spindle drive motor and the electric clutch.

FIG. 21 is a vertical, sectional view illustrating a typical power cylinder and piston for motivation of the slide on the machine.

FIG. 22 is a rear elevation of the forward stop switch housing assembly.

FIG. 23 is a vertical, sectional view of one of the switches taken approximately along 23—23 of FIG. 22.

FIG. 24 is a side elevation partially in section of the main reciprocating unit.

FIG. 25 is a plan elevation of an actuator ring.

FIG. 26 is a plan elevation of a spacer ring.

FIG. 27 is a sectional view taken approximately along 27—27 of FIG. 24.

FIGS. 28, 29 and 30 are simplified hydraulic and electrical diagrams typical for use in the operational control of this machine.

In the illustrated embodiment of FIG. 1 the machine tool has a bed or base 25 mounting a headstock 26 at one end. A spindle 27 is bearinged in the headstock to carry a chuck or other workpiece holding means such as a collet. At the other end of the base 25 is mounted a turret 30 and between the turret 30 and the headstock 26 there are supported a pair of opposed cross slides 31. Mounted on the headstock 26 is also shown a cutoff slide 31'. As shown in FIGS. 20 and 21, the cross slides 32 are guided crosswise of the machine upon a subbase 32 which is adjustably fastened to the machine bed 25 by means such as T bolt and slot connections 33.

Figure 29:
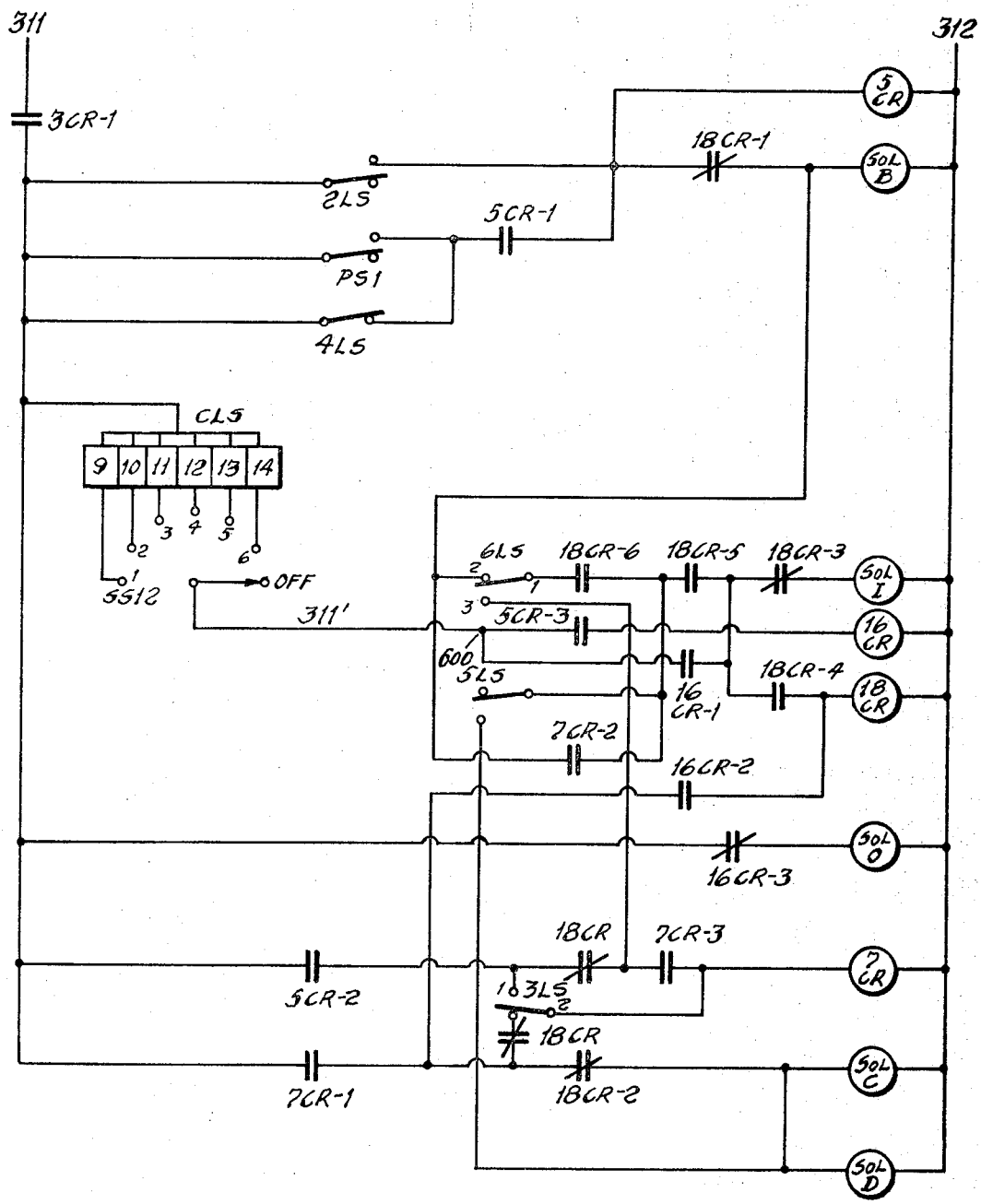

The turret 30 is slidably mounted on a turret slide member 34 which in turn is fastened to the base 25 by T bolt and slot connections 35. This construction just described could also be in the form of standard lathe construction if desired having a headstock on a lathe bed having slideways upon which both the cross slides and the turret are longitudinally movable.

The turret head 36 of the turret 30 is of the usual construction, being keyed to a central shaft 37, FIG. 10, and rotatably mounted in upper and lower bearings 40 and 41 and having an index ring 42. These bearings 40 and 41 are fitted into the turret slide 38. The index ring 42 has six radially displaced indexing slots 43 provided to receive an index plunger 44 which is biased by a spring 45 toward the index ring 42 locking it against rotational movement in any of six different radial positions. For each of these positions, a tool-receiving socket 46 is provided, each of which has tool-clamping means 47, as is the usual practice.

The shaft 37 has fastened to its lower end a bevel gear 48 meshing with a companion gear 49 rotatable on a shaft 50. Bevel gear 49 also has integral therewith a miter gear 51 and a ratchet wheel 52. As will be seen in FIG. 6, the ratchet wheel 52 is engaged by a pawl 53 pivoted at 54 and biased by a spring loaded plunger 55 toward the ratchet wheel 52. On the other side of the pivot 54 is an adjustable stop screw 56 which restrains movement of the pawl 53 toward the wheel 52. Longitudinal movement of the turret slide 38 in relation to the turret guide 34 will cause the pawl 53 to rotate the ratchet wheel 52 one sixth revolution for every back and forth movement of the turret slide and consequently the turret head 36 and its cutting tools.

Means must be provided to disengage the index plunger 44 from the index ring 42 and for this purpose there is preferably provided a lever 58 pivoted at 59 having upper and lower extensions 60 and 61. A detent cam 62 pivoted on a shaft 63 having a flat face 64 is held in the position, shown in FIG. 10, by a spring biased plunger 65 engaging the flat face 64. Since the shaft 63 is pivoted in the turret guide 34, it is stationary relative to the lever 58 pivoted on the turret slide 38 so that as the turret slide 38 moves to the left in FIG. 10, the plunger 44 cannot move into the index ring and further, the lever end 61 rotates the cam 62 about its shaft counterclockwise to clear the lever end 61 and let it pass by to the left. After passing by, the cam 62 returns to the position in FIG. 10 by the urging of its spring biased plunger 65. Upon reversal of the slide 38 to move to the right again, the lever end 61 is rotated clockwise about its pivot 59 causing retraction of the index plunger 44 out of one of the turret ring index slots 43 to permit the ratchet wheel 52 through its bevel gears 49, 48 to index the turret head 36 one-sixth turn to a new index position.

As soon as the index ring 42 has rotated an amount sufficient to keep the plunger 44 from going back into the index slot 43 from which it was withdrawn, lever end 61 will have passed over cam 62 allowing counter-clockwise rotation of end 61 around pivot 59. This allows plunger 44 to ride the outside diameter of the index ring 42, its spring 45 biasing it toward this ring until the next index slot 43 is in position, whereupon the plunger 44 enters the slot and precisely positions the index head 36.

Figure 9:
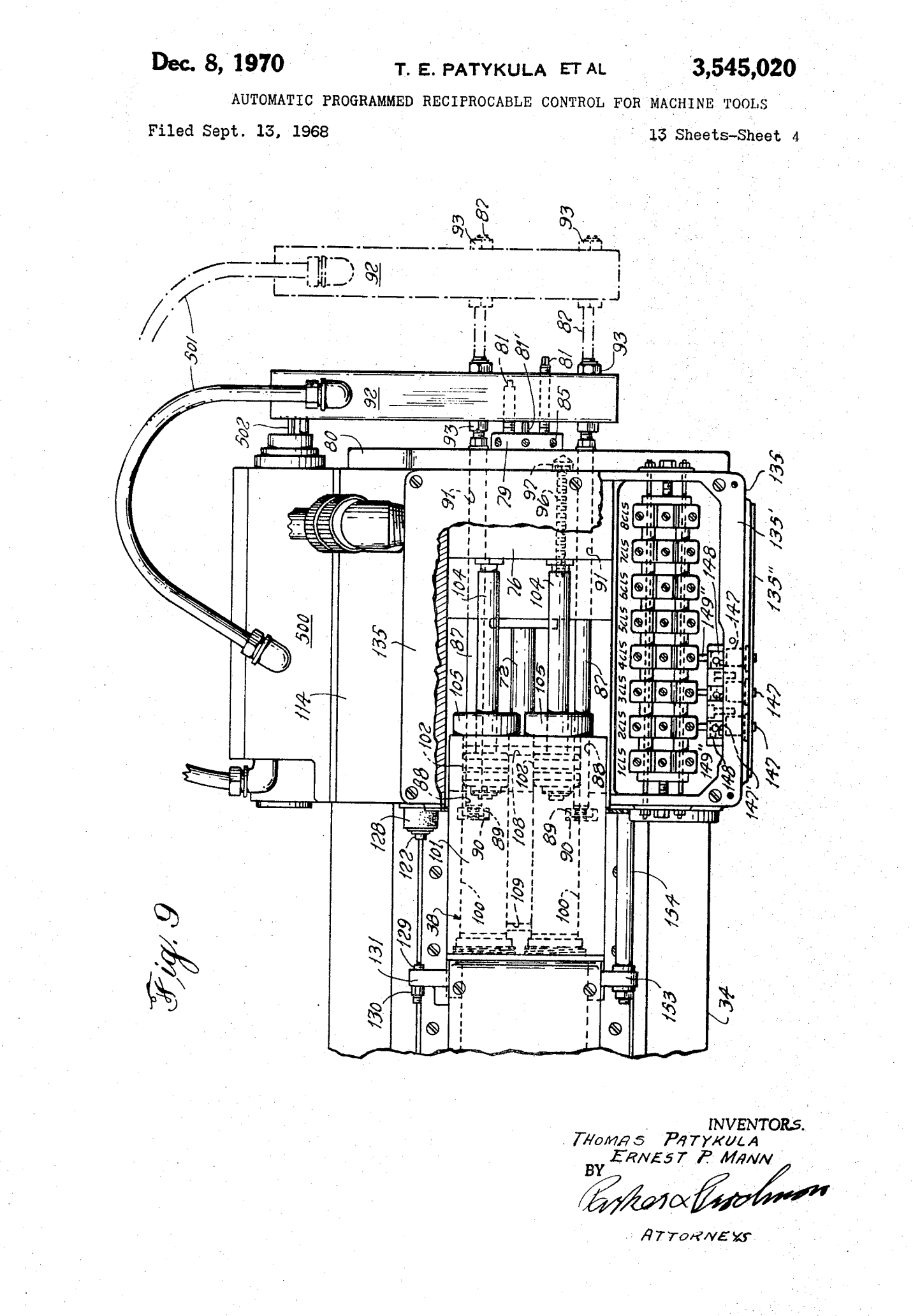

At the same time that this occurs the miter gear 51 engaging another miter gear 68 suitably journaled in a bearing block 69 rotates a shaft 70 suitably journalled at 71 and connected to a splined shaft 72, which is in sliding engagement with a female spline 73 of a stop drum 74, see FIG. 10. A housing 76 is bored to rotatably support the stop drum 74 and is mounted to the stationary turret guide member 34 by means of T bolts and slots 77. Attached to the end of the stop drum 74 by cap screws 78, FIG. 7, is a gear 79 enclosed by a back plate or cover 80. Stop drum 74 has six equally spaced, tapped holes adapted to receive six turret slide stop screws 81, each one representing and associated with a certain position of a cutting tool of the turret head 36. Stop screws 81 are provided with set collars 82 at their inner ends to prevent their complete removal from their threaded holes in the stop drum 74, these collars 82 being provided with clearance slots 84 in the stop drum 74 to permit their longitudinal adjustment. Lock screws 85 are provided to hold the adjustment of the stop screws 81. Looking at FIG. 9, it can be seen that the turret slide 38 is provided with a pair of rods 87 anchored to the turret slide 38 and loosely fitting in holes 88 with the rod ends threaded to square nuts 89, placed in milled slots 90. The rods 87 then pass through closely fitting holes 91 in the housing 76.

The ends of the rods 87 support a forward stop switch housing assembly 92 by means of nuts 93 which therefore moves forward with the turret slide and is shown in both its rear and forward positions. As is clearly illustrated in FIGS. 7, 22 and 23, the stop assembly is provided with a pair of cut-away portions 94 and is positioned in such a manner that only upper central stop screw 81' will abut or contact the button LS4–2 which is carried by plunger shaft LS4–3 of limit switch LS4 mounted within the stop assembly 92. The switch is biased in the open position by spring LS4–4 disposed in a recess about the plunger in the passageway 92' of the housing of the assembly. The plunger shaft is free to move horizontally within the assembly and is provided with a central annular recess LS4–5. Disposed thereabove and having limited vertical movement is plunger pin LS4–6 which is directed upwardly against microswitch LS4 for activation thereof when the shaft is displaced by the action of one of the stop screws 81 against button LS4–2. Cutaways 94 permit all but one of the stop screws 81 to clear the stop assembly 92.

Also carried by the assembly 92 is a second limit switch LS5, identical to LS4, but disposed at the opposite end of this assembly. Its plunger LS5–3 is aligned to be contacted via its button by the hydraulic shaft plunger of main reciprocating unit 500. Thus as the turret slide 38 moves forwardly to perform a cut upon the workpiece turning on the spindle 27 the total finished length of the cut will be determined by the adjustment of one of the stop screws 81. Flexible cable 501 carries the wiring connections from the housing assembly 92 to a main reciprocating unit while permitting movement of the housing with the turret. In other words, as each of six index positions comes up, the turret slide 38 can move toward the workpiece only to the position where the housing assembly 92, which is supported and movable with the turret slide 38, engages one of the stop screws 81 for this index position. The exposed end of the gear 79 has identifying numbers on its rear face so that the position of the index can be observed by the operator for setting up the machine, such as "1," "2," "3," "4," "5," "6."

Rearward stopping of the turret slide 38 is accomplished by an adjustable stop screw 96 and a lock nut 97, as seen in FIG. 9. Once properly adjusted, it remains so and therefore its slotted end is not exposed but covered by the back plate 80.

As best seen in FIGS. 9 and 10, a pair of hydraulic cylinders 100 are provided in a cylinder block 101 wherein the pistons 102 are contained. Their piston rods 104 pass out through seal end heads 105 and are secured, liquid-tight, into the housing 76. The rods 104 are tubular to provide a liquid passage to the back ends of the cylinders 100 and a liquid passage to the head ends of the cylinders, the cylinders 100 being connected at the back end by a passage 108 and at their head end by a passage 109, as shown in FIG. 28. The passage 106 of one piston rod 104 through drilled passages 110 in the housing 76 and turret guide 34 connects with a hydraulic line 416 while the other passage 107 through drilled passages 111 in the housing 76 and turret guide 34 connects with the hydraulic line 418. As shown in FIG. 8, a manifold 112 is provided to take the passages 110 and 111 around and underneath the mechanism to the passages in the turret guide 34 to avoid mechanical interference of the hydraulic lines.

As will be seen in FIGS. 4, 7, 9, 17, 18 and 19, a feed cam and switch enclosure 114 is attached to the far side of the housing 76. A feed speed shaft 115 suitably journalled in the enclosure 114 has mounted thereon six single rise cams 116', 117', 118', 119', 120' and 121' which are radially displaced 60 degrees apart and successively actuate their companion cam switches 9CLS, 10CLS, 11CLS, 12CLS, 13CLS and 14CLS. Each cam and its companion switch represents a certain index position of the turret head 36 and is timed therewith by a gear 117 meshing with an idler 118 which in turn meshes with the gear 79 mounted on the stop drum 74, as illustrated in FIG. 7. Both the stop drum gear 79 and gear 117 have the same number of teeth or step so they rotate or step from one index to the next in unison through their idler gear connection.

The cam switches 9CLS–14CLS each actuate a pair of solenoid valves which in turn select a set of adjustable needle valves for each turret head position as listed below and in FIG. 30.

| Turret position | Cam | Cam switch | Solenoid valve | Choke valve | Solenoid valve | Choke valve |
|---|---|---|---|---|---|---|
| 1 | 116 | 9CLS | VN | 40N | VP | 40P |
| 2 | 117 | 10CLS | VQ | 40Q | VR | 40R |
| 3 | 118 | 11CLS | VS | 40S | VT | 40T |
| 4 | 119 | 12CLS | VU | 40U | VV | 40V |
| 5 | 120 | 13CLS | VW | 40W | VX | 40X |
| 6 | 121 | 14CLS | VY | 40Y | VZ | 40Z |

The adjustable choke valve 40N may be used to control forward cutting feed speed of the cutting tool mounted in the No. 1 position or index of the turret head 36 while 40P may be used to control return or rearward cutting feed speed of that same tool.

For example, if No. 1 index is used for tapping threads in a hole adjustment of the needle of the choke valve 40N for in feed would be the same as the adjustment of the needle of 40P for the out feed. The hydraulic means to accomplish these operations will be explained later.

Also mounted in this enclosure is a limit switch 2LS of the reset type, i.e., a switch which holds when actuated and requires actuation of a release button to return to normal. As shown in FIGS. 17 and 18, it is in its open position, and as will be seen, its reset button 120 is in engagement with a reset block 121 fastened on the end of a sliding rod 122 which is slidably mounted in a bearing 123. An actuator block 124 is also fixed on the rod 122 in position to engage the plunger 125 of the back stroke switch 2LS. A spring 127 urges the block 124 away from the plunger 125 while the reset block 121 depresses the reset button. This is its normal condition. The end of the rod 122 extends out of the enclosure 114 through suitable bearing sleeve 126 which caries a rubber boot protector 128.

As is clearly shown in FIG. 9, the rod 122 lies in the path of an adjustable screw 129 locked by a nut 130 on an arm extension 131 of the turret slide 38. The turret slide 38 in FIG. 9 is illustrated in its forward position and upon its return to the right the screw 129 will engage the slide rod end 122 and actuate the switch 2LS into its closed position. As will be explained later, closing of the switch 2LS causes actuation of a valve which through the hydraulic circuit will cause the turret slide 38 to again advance or move to the left in FIG. 9. The construction just explained with the reset means gives a time delay to allow presure to build up in a pressure switch PS-1 to hold the valve 6A in forward position to prevent chatter of the turret slide 38 against the rear stop screw 96.

In FIGS. 4, 7, 9, 12, 13, 14 and 15 is shown a programming unit enclosure 135 mounted on the rear side of the housing 76. This enclosure 135 rotatably supports an upper function selecting cam shaft 136 and a lower slow down positioning cam shaft 137. The cam shaft 136 has fixed to its ends a gear 139 while the came shaft 137 has fixed to its another gear 140, both meshing with each other and each having the same number of teeth as the stop drum gear 79. An idler gear 141 serves as a driver between the stop drum gear 79 and the cam shaft gears 140. Thus they are kept in step with the indexing of the turret head 36 the same as explained for the cam shaft 115 with its gear 117.

The function selector shaft 136 is provided with a front section 136b and a rear section 136a each being angularly displaced 30 degrees from the other. Both shafts are milled to provide six equally spaced male dovetail slides 142a and 142b. Stop pins 143 are provided on all these slides as well as stop collars 144 to limit the sliding movement of sliding cams 145. In all there are twenty-four sliding cams 145 on the shaft portion 136a and twenty-four cams 145 on the shaft portion 136b, giving a total of forty-eight. Directly above the cam shaft 136b are the cam switches 1CLS, 2CLS, 3CLS and 4CLS which when acted upon by the cams 145 on that portion will be momentarily closing switches, while those above the cam shaft 136a, the cam switches 5CLS, 6CLS, 7CLS and 8CLS, will be maintained closed when acted upon by their cams. As will be readily seen in FIG. 16, the cams 145 are machined to fit the dovetail configuration of 136a and 136b and have springs 146 which through their biasing action against the dovetail slide provide enough friction to prevent unintentional displacement from the position they are selectively placed in.

As mentioned before, the stop pins 143 and the stop collars 144 limit the positioning of the cams 145 on their dovetail slides. This is to permit positioning a cam into or out of the path of the cam switches 1CLS–8CLS just by sliding the cam one way or the other without the need of a tool.

It will now be seen that each of the cam switches 1CLS–8CLS has available to actuate it six cams 145, each cam representing a position of the index head 36, that can be moved into the path of that switch and actuate it at any one of the six index positions, the switches 1CLS, 2CLS, 3CLS and 4CLS being momentarily actuated while the switches 5CLS, 6CLS, 7CLS and 8CLS would be maintained closed. The momentary switches 1CLS–4CLS would be actuated while indexing is going on while the maintained switches 5CLS–8CLS would be actuated at the end of the indexing, due to their relative angular displacement.

Whether momentary or maintained switches are used is immaterial since this would be dictated by the electrical circuitry used and the number of functions requiring one or the other type of cam switch.

In FIGS. 2, 3, 9 and 13 are shown manual means for operation of the cam switches 2CLS, 3CLS and 4CLS. Description of one will suffice for all since they are of identical construction and also only three are shown, but any of the cam switches 1CLS–8CLS could be provided with a manual control if desired.

Above the programming enclosure 135 is mounted the switch enclosure 135'. Eccentric bushings 147 are rotatably held in suitable openings in the switch enclosure 135' by a front indicia plate 135''. The eccentric bushings at their inside faces have an eccentric pin 147' engaging in a horizontal slot 148' of a switch slide member 148 which is mounted on the enclosure wall 135' in such a way that it can slide vertically and is spring loaded to keep it in a down position. The slide member 148 has at its lower end a finger 149 engaging a switch actuator in the form of cam roller 149' and an extension 149'' thereof. The exposed part of the eccentric bushing 147 is provided with a screw driver slot so that in setting up the machine the operator can trip any one of the three switches shown to initiate operation of that slide chosen.

As shown in FIGS. 13 and 15, the slow down positioning shaft 137 comprises similar male dovetail slides 150 which carry six adjustable cams 151 having set screws 152. These cams 151 are adjustable in direction in line with the axis of the positioning shaft 137 and the horizontal movement of the slide 38. Each of the six cams 151 is timed as explained, by the gear 140 with the turret head 36 and represents one of the turret index positions. Connection to the slide 38 is provided through a lug 153 on the fore side of the slide 38 to which the left hand end of a slide rod 154 is rotatably secured. This rod 154 is slidably keyed to a tubular member 156 by a key 157, and a long spline 158. The tubular member 156 is journalled in the programming enclosure 135 and held against endwise movement by a split end ring 159, sleeve 156', switch lever 164 and the end cover 80. A roller 160 on a shaft 161 is set into the end of the slide rod 154 by a set screw 162, the shaft 161 being permitted to slide in the member 156 by means of a pair of slots 163. Thus, whenever the slide 38 moves toward or away from the workpiece, the roller 160 will follow this movement and engage one of the cams 151 in any of the six index positions. Engagement of the roller 160 with a cam 151 will cause the roller to be swung about the center of the shaft 154, the tubular member 156 rotating with it through its key and spline connections 157 and 158. This swinging action of the roller 160 is transmitted through the rod 154 and the key 157 to the switchlever 164 in engagement with a limit switch 3LS which is normally held open by a spring 165 biasing the lever 164 downwardly against a stop pin 166. The cams 151 can be set by their set screws 151 in any position along the dovetail slides 150 and as the roller 160 is moved by its connection with the turret slide 38, it will engage a cam and lift its arm 161 to close the switch 3LS for any one of the turret index positions, this permitting through circuitry yet to be explained, fast traverse of the turret 36 toward a workpiece and upon closure of the limit switch 3LS, which causes actuation of hydraulic valving to provide slow cutting feed speed, for proper finish of a cut for any particular index position.

The tubular member 156 is provided with an extension 166 having a hexagonal end which projects beyond the cover 80 for manual use by the operator to put the turret in "feed" when setting up the machine.

A brief description of a typical cross slide 31, which could be a front, rear or cutoff slide, and the control mechanisms are full described in the following patents issued to Henry L. Cunningham:

(a) Patent No. 3,173,337, entitled "Hydraulic Variable Speed Feed Mechanism for Machine Tools and the Like" issued on Mar. 16, 1965.

(b) Patent No. 3,224,070, entitled "Automatic Machine Tool Control Mechanism" issued Dec. 21, 1965.

As shown in FIGS. 20 and 21, the cross slide 31 is suitably guided on its sub-base 32 and has a depending member 203 provided with a stop screw 204 to limit the forward movement of the slide 31 and its cutting tool. Also fixed to the depending member 203 is a piston rod 205 which passes through a seal 206 into a cylinder 207 in the sub-base 32. The piston rod 205 is hollow and adjustably retains a plunger adjusting member 208 having a threaded extension 209 threaded into the outer end of the piston rod 205 and having a lock nut 210. A poppet valve plunger 212 having a valve seat 214 is resiliently urged to the right by a spring 214' against a stop in the plunger adjusting member 208 and extends beyond the piston 215. A stop collar 216 limits the back stroke movement of the piston 215. At the head end of the cylinder 207 a valve bushing 217 is provided for seating with the valve seat 214.

Fluid pressure enters behind the piston 215 through the line 430 and moves the piston and slide 31 toward the work piece at traverse speed, fluid at the head of the piston flowing out through the lines 402 and 404. When the plunger valve seat 214 seals off the valve bushing 217, fluid then is restricted to flowing out of the line 404 which is under control of an adjustable restriction 406 to restrict the cutting feed speed of the tool on the slide 31 while taking its cut on the workpiece.

Up to this point this description has included mainly details of construction of the turret and its mechanical and hydraulic operable parts associated with electrical switches 1CLS–8CLS under the auxiliary functions which are the programming portion of this machine. Also the feed control switches 9CLS–14CLS which control the cutting speed both "forward" and "retract" of the turret slide 38. Also the slow down limit switch 3LS controlling the point of slow down of the slide 38 and the back stroke limit switch 2LS which reinitiates another stroke of the slide.

From the foregoing description it should be apparent that by proper setting up of the auxiliary function cams 145, the turret slide upon moving forward, doing its work upon the workpiece and returning, will index itself as well as index the function selection shaft 136, the slow down positioning shaft 137 and the feed speed shaft 115. Indexing of these shafts 136, 137 and 115 bring up the next set of functions for the machine to go through. The turret slide 38 will continue to index further functions on each back and forth movements until the "stop cycle" switch 1CLS is actuated, whereupon further work on the workpiece is brought to a stop.

If desired, since there are six index positions, the machine could be double or triple tooled. In the first case two sets of three different tools could be used to give operations on two workpieces successively. In the second case three sets of two different tools could be used to give operations on three workpieces during one revolution of the turret.

When a "speed change" is called for by a cam 145, actuating the cam switch 5CLS, its actuation will cause the electric clutch 338, see FIGS. 20 and 28, to be activated and to lower the spindle speed to low, there being in this case a normal high speed and the low speed available.

If tapping is called for, the cam switch 6CLS will be acted upon by a cam 145, whereupon a sequence of forward low speed, reverse and back to forward high speed will be initiated.

With the "feed stock" cam switch 7CLS actuated by a cam, initiation of a sequence takes place which will open the collet, feed stock through an air-operated bar feed against a turret stop and close the collet again. It of course must be assumed that the finished workpiece has been cut off before the previous operation ended.

When the "turret with cross slide" switch 8CLS is closed by a cam, if any or all of the cross slide functions have been selected, the turret and slides will start out together. Otherwise the turret will be held back until the slides have completed their cycle.

If the "stop cycle" cam is not set up to operate the switch 1CLS and the "cut-off" switch 4CLS is set up with the "feed stock" switch 7CLS, it will be seen that the machine would automatically continue to finish the workpieces and cut them off until all of the bar stock is consumed.

Since elaborate or less complicated circuits might be used with the invention thus far explained as well as "closed" switches instead of "open" switches, it is not to be assumed as a limitation when one or the other term is used in the following simplified hydraulic and electrical control circuits explanation.

As illustrated in FIGS. 7 and 9 a programmed main reciprocating unit 500 is attached to the machine by removing the cover of the rear housing 114 and affixing thereto the said unit. This main reciprocating unit has extending therefrom a plunger shaft 502 which is in alignment with button LS5-2 of switch LS5 so as to contact the same. FIG. 24 illustrates in detail the reciprocating unit 500 with the plunger shaft 502 fully extended and which shaft is carried within the housing for back and forth movement. The plunger shaft 502 is provided with an axial bore 503 at the rear thereof which is lined with a sleeve 504 so as to form a cylinder 505. Disposed approximately centrally of the unit and within the cylinder 505 is a piston 506 which is stationary with respect to the unit but about which the plunger shaft 502 moves longitudinally. The piston is fixed and supported by a piston rod 507 which has enclosed therein a central bore 508 and an outer annular bore 509. The inner central bore 508 extends rearwardly and communicates with a hydraulic hose 510. At its opposite end it communicates directly with the cylinder portion 505 forward of the piston 506. The annular bore 509 is connected to another hydraulic hose 511 and extends forwardly to the rear portion 512 of the piston so as to connect the hose 511 thereto. With the piston 506 held stationary by the rod 507 the plunger shaft moves to the left (extended position as shown) when hydraulic fluid is applied through hose 510 and evacuated via hose 511. Conversely the shaft is retracted when fluid is fed by hose 511 and released by hose 510. Where both hoses are connected to a sump for evacuation, the shaft 502 will remain stationary but free to move when acted upon by an external force.

Mounted for movement with and on the outer surface of the shaft are a longitudinal stack 513 of actuator rings 514 which are carried in an annular recess 515. Disposed between each of the actuators rings 514 is a spacer ring 516. These rings and spacers are clearly illustrated in FIGS. 25 and 26 and should be considered together with main reciprocating unit of FIG. 24. Each spacer 516 is essentially an annular disc having a keyway 517. The actuator ring 514 is also essentially an annular disc but is provided with an extended keyway 518 or clearance key which permits the rings to be rotated approximately 45° when mounted on the key 519 since they have a clearance in the bore or recess. Two thicker washers 520 are disposed on the forward end of the plunger shaft adjacent the most forward washer and have disposed therebetween a wave washer 521 which is slightly deflected.

Each actuator ring is provided with an outwardly extending contactor or lobe 522 approximately opposite the machined away clearance keyway 518 and adjacent an adjusting projection 523 for manually rotating each individual ring.

Referring now to FIG. 27 it is apparent that approximately a 90° section of the housing around the shaft has been removed. This allows the actuator rings to be rotated externally, approximately 45° around the shaft. Fixedly mounted on the reciprocating main unit directly above the actuator rings is a limit microswitch 6LS whose roller 524 is positioned centrally over the rings. By rotating the actuator rings 514 they may be individually set to have their contact lobes 522 either engage the switch roller 524 or clear the roller, thus either actuating the switch or clearing it. In actual use a screw driver is employed against the adjusting projections 523 on the rings to engage the roller and set up the reciprocating cycle which will be explained hereinafter. The reciprocating increment lengths can be set to the distance between the actuator rings and a ⅛" pitch distance has been found to be satisfactory for most machining purposes.

Operation of hydraulic and electrical control circuits non-reciprocating

The circuit diagrams shown in FIGS. 28, 29 and 30 are simplified for ease of description and illustration and lack the elaborate interlock and fail safe complications normally incorporated in highly complex industrial equipment of this variety.

The condition of the parts and mechanism shown in these diagrams are in their non-working or retracted positions. The front and rear cross slides are retracted away from the workpiece, the turret slide 38 is likewise retracted and the hydraulic valves, electrical solenoids in their de-energized positions.

Considering initially normal operation, that is, non-reciprocating and, assuming the proper cams have been set up for a particular cycle of operations, the operator would start the spindle drive motor 300 by closing the motor switch 302 providing current to the motor through lines 304 and 306. The motor 300 is now operating at high speed and the driven spindle 27 has in its chuck a workpiece. It is also assumed that the hydraulic pump motor (not shown) has been energized and variable volume pump P is delivering hydraulic fluid under pressure. Fluid under pressure from pump P flows from the line 400 to the front cross slide valve 6C to line 402 holding its piston 215 in back position and returns through line 404, through choke valve 406 to sump 408, see FIGS. 21 and 28. Similarly fluid from line 400 flows to rear cross slide valve 6B to line 410 holding its piston 215 in back position and returns through line 412, choke valve 414 to sump 408.

Fluid also flows from line 400 to the valve 6A, to the line 416 through the tubular piston rod passage 106 and a port 108 into the back side of the cylinders 100, 100, which are connected by the cylinder port 108, thus holding the turret slide 38 in retracted position. The front side of the cylinders connected by the port 109 and hollow piston rod passage 107 are connected to the line 418, back to the valve 6A, to line 420. Line 420 connects to valve 5C, to line 422 to the sump 408. Line 420 also connects to a series of choke valves 40P, 40R, 40T, 40V, 40X and 40Z as shown in FIG. 30, the purpose of which will be explained.

The start cycle switch 308 is then closed to provide current from the line 310 to the coil of the relay switch 3CR to the other side of the line 312.

Relay 3CR thus energized closes the holding contactor 314, connecting the line 310, through line 316, contacts of contactor 314, line 318, closed stop cycle cam switch 1CLS, line 320, closed stop cycle push switch 322 back to line 310, permitting release of start cycle switch 308 but still keeping relay 3CR energized. While the stop cycle cam switch 1CLS has been previously described as a momentary closing switch, since this circuit description and these diagrams of FIGS. 28 and 30 are simplified for ease of description, we will take the liberty to use the cam switch 1CLS in this instance as a maintained switch, normally closed and opened when engaged by a cam 145.

Contactor 319 now closing its upper contacts in the line 310 provides current to the line 311, while just previous to the relay 3CR being energized the contactor 319 was closing the lower contacts in the line 323 to the line 324 providing current to the solenoid A of the valve 5B and back to the line 312. Energization of this solenoid A had held the valve 5B in its shut off position which, as will be later explained, locked the turret from moving in either direction forward or backward.

Current now in line 311 (see FIG. 29) passes through now closed contacts 3CR-1, through also closed limit switch 2LS, through the normally closed contacts of 18CR-1 (whose relay is open when the machine is in non-reciprocating operation) to solenoid B of valve 6A and then to the other side of the line 312, energizing the solenoid B and shifting the valve 6A to its other position. This position of the valve 6A passes oil under pressure from the line 400 to the line 418, hollow-piston rod passage 107, to the front end of the cylinders 100, 100 of the turret slide 38 causing the turret to advance toward the workpiece. Exhausting oil in the hydraulic line 416 causes pressure switch PS1 to close. This pressure switch PS1 is in series with the normally open contacts 5CR-1 and the solenoid B. The control relay 5CR is energized through closed 2LS after the turret is indexed and normally sends the turret forward again so that the solenoid B is held energized since the switch 2LS will be open by its reset button 120 being activated when the turret moves away from it. Current from line 311 flows through now closed PS1, and contacts 5CR-1 and normally closed contacts 18CR-1 to solenoid B and then to the other side of line 312, thus holding this solenoid in its energized condition to cause the turret to continue advancing with valve 6A being held. Under this condition the turret will move forward in rapid traverse until the limit switch 3LS is thrown into the up position (FIG. 29) by one of the six adjustable feed cams 151 on the slow down positioning drum shaft (see FIG. 15) and, when it has passed over the cam 151, it will again assume the condition as illustrated in FIG. 29.

When 3LS is actuated into the upward contact position 1 by the advancing turret, current from line 311 flows through now closed contacts 5CR-2, contact 2 of 3LS, control relay 7CR which is thereby energized, and to line 312. With 7CR activated, current also flows from line 311 through contacts 7CR-1, normally closed contacts 18CR-2 to solenoids C and D of valves 5A and 5C and returns via line 312. Thus valves 5A and 5C are shifted to their other positions by energized solenoids C and D.

Shifting of the valve 5C to closed position blocks the line 420 from the line 422 and also to the previously mentioned choke valves 40P, 40R, 40T, 40V, 40X and 40Z. Shifting of the valve 5A blocks off the line 422 going to sump and causes exhaust oil, from the cylinders 100, 100 of the traversing turret, in the line 416 to flow through shifted valve 6A to line 424 through valve 5B still in the position shown in FIG. 28 to the line 426 which in FIG. 30 is shown connected to choke valves 40N, 40Q, 40S, 40U, 40W and 40Y.

Speed of forward movement of the turret slide 38 is now controlled by any one of the solenoid-operated, two-way valves N, Q, S, U, W or Y, depending upon which one is energized by its cam switch 9CLS, 10CLS, 11CLS, 12CLS, 13CLS or 14CLS.

These cam switches 9CLS–14CLS are actuated by the previously described cams 116′, 117′, 118′, 119′, 120′ and 121′ on the feed cam shaft 115 shown in FIGS. 17, 18 and 19, and are rotated into actuating position by this shaft and its geared connection to the turret tool in position at that instant. Therefore, for that particular cut or operation the proper cam will close that switch, for example, let us say 12CLS to provide current from the line 311, closed switch 12CLS, line 330, the solenoid of valve U and back to the other side of the line 312, thus energizing the solenoid and shifting the valve U to open position. Open valve U allows a flow of exhaust oil from the line 426 to flow through the choke valve 40U, through the open valve U to the sump line 428 and to the sump 408. The choke valve 40U of course has been adjusted to permit just the right flow of oil through it to give the turret slide 38 the correct cutting feed speed.

It should be mentioned here that all of the choke valves 40N, 40Q, 40S, 40W, 40Y may be adjusted to give low to high feed cutting speeds while choke valves 40P, 40R, 40T, 40V, 40X and 40Z adjust the return or retract speed.

The turret thus, will now advance and cut the workpiece at the proper speed for that particular type of work. When the turret movement is stopped by its stop screw 81, the pressure switch PS1 opens, opening the current supply to the solenoid B of the valve 6A, shifting this valve back to the position shown in FIG. 28 causing the turret to start to return ti its retracted position shown in FIG. 28 whereupon it actuates the limit switch 3LS, which opens 7CR and the current supply to the solenoids C of valve 5A and D of valve 5C. While the turret slide 38 is returning back and the solenoid D is still energized with its valve 5C still closed blocking the line 420 from the line 422 and the sump 408, return or exhaust oil in the line 420 is made to pass through the choke 40V, which controls the speed at which the turret slide 38 will retract. The solenoid of the valve VV of course is energized and held open by the closure of the cam switch 12CLS which previously controlled the forward feed speed of the turret slide 38.

After valve 5C opens (when limit switch 3LS is again actuated during the retraction of the turret) the turret 38 will then rapidly traverse back because of fluid returning unimpeded directly to the sump 408, index and repeat a cycle. Since indexing takes place while the turret is traversing back a new stop screw 81 will be brought into position and a new cutting tool with of course a new position of cam settings on the feed shaft 115, auxiliary functions shaft 136 and the slow down positioning shaft 137. Since the turret has six positions for six different cutting tools, six different operations can be performed on the workpiece, each operation having its own forward traverse, depth of cut, feed speed, return speed feed and traverse set up to suit that particular individual operation.

If while setting up the machine it is desired that the cycle be stopped while the turret is in forward movement, selector switch 322A shown in FIG. 28 is closed which will energize solenoid A, which holds the valve 5B in its shutoff position, locking the turret in the desired position.

When the auxiliary functions cam 145 (see FIG. 12), which has been set up under the came switch 1CLS comes up and opens it, which for this simplified description is now a normally closed switch, it will open the holding circuit to the relay 3CR and stop the machine at the end of any or all index stations of the turret, depending on how it was set up.

Up to this point consideration has only been given to the turret and how it is controlled. Operation of the front and rear slides will now be described.

Upon actuation, i.e., closing the cam switch 2CLS on the auxiliary functions shaft 136 by its cam 145, current will flow from the line 311 to the switch 2CLS, to line 332, to the solenoid E of the valve 6C and back to the other side of line 312, energizing it and shifting the valve 6C to the position opposite to that shown in FIG. 28. Fluid pressure from the line 400 then flows to the line 430 to the cylinder 207 behind the piston 215, and the front cross slide 31 starts to move forward. Exhaust fluid from the cylinder 207, line 404 actuates the pressure switch P32 which holds the circiut to the solenoid E, providing it with current. Front slide 31 moves forward in rapid traverse until its adjustable internal poppet valve 214 closes the rapid traverse port 402, it then directs all exhaust fluid to the line 404, through the choke valve 406 and then to the sump pump 408. Forward feed speed is then under control of the choke valve 406 according to its adjustment. When the slide 31 is stopped by its stop screw 204, the exhaust pressure drops and pressure switch PS2 opens and the solenoid E is deenergized shifting the valve 6C to the position shown in FIG. 28, whereupon the front slide 31 will retract in rapid traverse to its back position.

The just explained operation of the front slide could also occur if desired when the machine operator would actuate the cam switch 2CLS by turning the manual eccentric actuator 147 with a screw driver, as illustrated in FIG. 3 and FIG. 13. Also shown in these figures are manual eccentric actuators 147 for the rear slide and for a cut off slide is used. The "cut off," "tap," "feed stock" and "turret with cross slide" features have not been shown herein since they would be similar in nature and duplications of the front and rear slides illustrated. These would be under the control of the cams and switches 6CLS, 7CLS and 8CLS shown in FIGS. 12, 13. The "turret with cross slide" function when placed into operation with any one, two or all of the slide functions would initiate all of the slides called for simultaneously with the turret and would all start together, this being accomplished by circuitry not shown, only the initiating cam switch 8CLS being shown.

Operation of the rear slide 31 is similar to that just described for the front slide with the exception that it is brought into operation by the tripping of the cam switch 3CLS either by its cam 145 or manually by its eccentric actuator 147 closing it, to provide current from the line 311 to the line 334 to energize the solenoid F and shift the valve 6B to provide fluid pressure to move the rear slide forward as just explained for the front slide 31.

When it is found desirable to change the speed of the spindle from high speed to low speed during any one of the functions, one of the six speed change cams 145 on the auxiliary functions shaft 136 is moved into actuating position. When it actuates the speed change cam switch 5CLS as will be seen in FIG. 28, current then flows from the line 311 through closed cam switch 5CLS, to line 336, slow speed clutch 338 and back to the other side of the line 312, energizing the clutch 338 to cause the spindle to run in low speed.

Reciprocating operation

In order to initiate the reciprocating cycle a 7 position selector switch SS12 (see FIGS. 29 and 30) which may be mounted on the main unit, in order to be readily accesible to the operator, has 6 of its contacts 1-6, each respectively connected via feed control switches 9CLS-14CLS to power line 311. Under these conditions when one of these feed control switches is actuated in its normal operation, one of the respective contacts SS12 is energized. If SS12 is in the "off" position then the operation of the turret will be normal or as hereinbefore described. If, however, this switch SS12 is set to one of the positions 1-6 indicating one of the turret stations, then, when this station is reached, current will flow from line 311 through that, in circuit, control switch CLS, switch SS12, to the line designated 311' and to terminal 600 of FIG. 29. As explained hereinbefore, when the turret is fully retracted microswitch 2LS is closed so that line 311 is connected to relay 5CR through closed relay contacts 3CR-1. When relay 5CR is activated its contact 5CR-3 closes and causes current to pass through relay 16CR. Relay 5CR is employed in the normal circuitry to send the turret into its forward movement after indexing. With relay 16CR closed by the turret indexing, current from line 311' passes through closed contacts 16CR-1, normally closed contacts 18CR-3 to solenoid I. Energization of solenoid I shifts the hydraulic valve 601 so as to extend the plunger shaft 502. As the turret advances microswitch 3LS will be momentarily closed thereby causing relay 7CR to be closed to line 311 via closed contacts 5CR-2 and switch 3LS. With relay 7CR energized current will also flow from line 311, now closed contacts 7CR-1, and contacts 16CR-2, thus energizing relay 18CR. Immediately thereafter relay 7CR is de-energized but relay 18CR remains energized via line 311', closed contacts 16CR-1 and now closed contact 18CR-4. When relay 18CR is energized with the activation of switch 3LS, solenoid I is deactivated since normally closed contacts 18CR-3 will open, and the valve 601 is returned to its center position where fluid will exhaust from both sides of the piston and the plunger shaft 502 may be readily pushed inwardly by the switch housing assembly 92. The plunger shaft 502 contacts microswitch 5LS and causes its contact to close and thereby supply current via switch SS12, line 311', contacts 16CR-1 and 18CR-5, switch 5LS to solenoids C and D which now put the turret into normal feed. The plunger shaft is pushed inwardly as the turret advances until the first actuator ring 514 set to contact the roller 524 of switch 6LS actually engages the roller.

It should be noted at this point that solenoid B which previously was under the control of switch 2LS and contachs 18CR-1 was deenergized when relay 18CR closed but was energized thereafter via switch SS12, line 311', now closed contacts 16CR-1, 18CR-5, 18CR-6 and contacts 1-2 of switch 6LS. Now with switch 6LS activated by the actuator ring 514 to assume the 1-3 position, solenoid B is de-energized and the valve 6A is shifted thus reversing the turret to move rearwardly. This results in switch 5L5 being reacted from contact with plunger shaft 502 thereby causing solenoids C and D to release and placing the turrent into traverse. The turret moves rearwardly until switch 3LS is closed which causes relay 7CR to be re-energized through contacts 5CR-2. With the energizing of 7CR, the turret is made to progress forwardly through current passing via switch SS12, line 311', contacts 16CR-1, 18CR-5, 7CR-2 to energize solenoid B and shift valve 6A. The turret continues in forward traverse until the plunger shaft again contacts switch 5LS and then advances at the feed rate. This is at the point in its forward motion at which the first actuator ring had previously activated switch 6LS. This forward motion forces the first ring to pass the rollers of switch 6LS and shift this switch back into its 1-2 contact position. In this contact position of 6LS solenoid B will remain energized although 7CR has been deenergized. 7CR was deenergized as soon as 6LS shifted to 1-2 since it (7CR) was energized via SS12, line 311', 16CR-1, 18CR-5, 18CR-6, contacts 1-3 of 6LS and 7CR-3. This action has now set up the same electrical conditions as before so that when the next set actuator ring 514 contacts the rollers of switch 6LS the entire cycle will be repeated (reciprocation) except that for each reciprocation the feed occurs with the turret further advanced in the workpiece. The reciprocation will be repeated depending on the condition of the actuator rings as set by the operator.

The operation continues until the full length or depth of the operation is completed at which time the stop screw 81 for that particular station (as previously set for depth) contacts switch 4LS carried by the advancing switch housing assembly 92 and opens the contacts of 4LS. It is clear that all through the reciprocating cycle relay 5CR has been energized by the closed contacts of 4LS and normally open contacts 5CR-1 or by 1PS which is closed only while pressure exists on hydraulic line 416. When 4LS opens, 5CR is only energized through 1PS but when the turret (via housing assembly 92) hits a solid stop, namely stop 81, the pressure in line 416 suddenly drops and opens 1PS (pressure switch). Thereafter as 5CR is deenergized, relay 16CR is deenergized with the opening of contacts 5CR–3. Relay 18CR is deenergized with the opening of 16CR–1 and/or 16CR–2. Solenoid B is also de-energized and valve 6A shifts putting the turret in reverse and causing it to retract. During its retraction, switch 3LS is again placed in its position of normalcy and the turret will continue its retraction at the traverse rate. It should be noted that all during the reciprocating cycle solenoid "O" has been de-energized since normally closed contacts 16CR–3 where open due to the fact that relay 16CR was energized. When relay 16CR was de-energized at the termination of the reciprocating cycle solenoid "O" was energized and valve 601 was shifted thus causing the plunger shaft 502 to be fully retracted and held in such retracted position until the next reciprocating cycle is called for.

Obviously many modifications and variations of the present invention are possible in the light of the above teachings. It is, therefore, to be understood that within the scope of appended claims, the invention may be practiced otherwise than as specifically described hereinabove.

We claim:
1. In a hydraulically operable machine having a linearly movable turret, including hydraulic means for advancing and retracting said turret from a workpiece, means for successively rotationally indexing the turret to one of a plurality of stations during the retraction of said turret, hydraulic and control means for traversing said turret forwardly at a pre-determined speed and distance, then forwardly at a selected speed for operation on said workpiece and finally retracting, that improvement for an automatically programmed control which selectively imparts reciprocating motion to said turret for progressive and successive operations on said workpiece at any of said stations which comprises:
   a reciprocating control unit fixedly supported on said machine and having,
      a double acting hydraulic piston and cylinder assembly,
      a plunger shaft carried by said cylinder for movement inwardly and outwardly of said unit,
      unit means for extending said plunger shaft outwardly at the start of a reciprocating cycle and thereafter permitting said shaft to be moved freely, and, at the termination of said cycle to retract said plunger shaft,
      said cylinder carrying a plurality of spaced apart selectively adjustable actuator means,
      a stationary single pole-double throw switch supported to be actuated by those of said actuator means selectively adjusted for contact therewith,
      first electrical means connecting said stationary switch with said hydraulic and control means for partially retracting said turret when said stationary switch is actuated into one contact position and for again advancing said turret after it has retracted,
   a stop block assembly affixed for movement with said turret and carrying a single pole-double throw switch having its actuator in line for contact with said plunger shaft,
   coupling means indexed with said turret for rendering said reciprocating control unit effective when said turret is at any selected station, whereby when said turret advances after first having retracted, said stop block assembly switch will contact said plunger shaft at the forward turret position at which said stationary switch was actuated and said assembly switch will assume one contact position for moving said turret at feed speed past said forward turret position thereby causing said stationary switch to assume the other of its contact positions, said turret will advance until the next selected adjustable actuator means contacts said stationary switch, said reciprocating operation will continue thereafter until terminated by said control means and said turret indexed to its next station.

2. The improvement according to claim 1 wherein said double acting hydraulic piston and cylinder includes:
   a closed hollow cylinder supported for lengthwise movement,
   a stationary piston disposed in said cylinder,
   a piston rod carried by said piston and having therein a pair of fluid conduits, one of said conduits communicating with the chamber formed forward of said piston and the other of said conduits communicating with the chamber formed rearward of said piston,
   a source of motive fluid,
   a fluid sump,
   means for selectively admitting and discharging said motive fluid through said conduits whereby when said fluid is admitted through said one of said conduits and discharged through said other conduit to said sump said cylinder will be moved in one direction, when said fluid is admitted through said other conduit and discharged through said one conduit to said sump said cylinder will be moved in the opposite direction, and when fluid is discharged through both of said conduits to said sump said cylinder will be free to move in either direction.

3. The improvement according to claim 2 wherein said means for selectively admitting and discharging said motive fluid includes:
   a reciprocating unit valve having a pair of activated positions and an intermediate normal position, one of said activated positions connecting said fluid source to said one conduit and the said other conduit to said sump, the other of said activated positions connecting said fluid source to said other conduit and said one conduit to said sump, and said normal position connecting both of said conduits to said sump,
   valve operating means for selectively placing said unit valve in one of said positions.

4. The improvement according to claim 3 wherein said valve operating means is:
   a pair of electrical solenoids, one of said solenoids mechanically connected to actuate said unit valve into said one activated position, the other of said solenoids mechanically connected to actuate said unit valve into said other activated position, 5. The improvement according to claim 4 wherein said actuator means includes:
   a stack of spaced apart annular disc actuator rings supported lengthwise about said cylinder,
   said actuator rings being provided with an outwardly extending contactor lobe, an adjusting projection, and an internal keyway clearance portion,
   said cylinder being provided on its outer surface with a key,
   means for confining said rings peripherally about said cylinder against lengthwise movement and limited rotational movement when said keyway clearance portion and said key are in abutting relation.

6. The improvement according to claim 5 wherein said means for confining includes:
   said cylinder being provided with an annular recess in its outer surface and having disposed therein said stack of rings,
   annular disc spacers interposed between said rings and each of said spacers having an internal keyway for engagement with said key to prevent rotation of said spacers,
   a pair of disc washers disposed in said recess at one end of said stack and abutting one end shoulder of said recess, a biasing member interposed between said spacers for providing a tight abutting relation between said spacers, rings, and washers.

7. The improvement according to claim 6 wherein said stationary switch is a microswitch having an actuating roller in line with and for contact with the said contactor lobe of said rings which are selectively rotated for contact therewith.

8. The improvement according to claim 7 wherein said coupling means includes:
  a cam operated electrical switch for each of said turret positions,
  a cam means indexed with said turret for individually actuating one of said cam switches, dependent on the position of said turret,
  a single pole multiple contact switch having its contacts individually connected to one of said cam switches, and having its pole contact connected to said reciprocating control unit, whereby when a source of electrical energy is supplied to all of said cam switches said control unit will only be effective dependent on the selected position of said pole of said multiple switch.

References Cited
UNITED STATES PATENTS

| | | | |
|---|---|---|---|
| 3,060,466 | 10/1962 | Kozacka | 10—128 |
| 3,190,151 | 6/1965 | Kozacka | 77—25 |
| 3,129,613 | 4/1964 | Burg | 77—32.3 |
| 3,232,143 | 2/1966 | Schurger et al. | 77—32.8 |
| 3,478,624 | 11/1969 | Stafford | 77—32.1 |

CHARLES W. LANHAM, Primary Examiner

E. M. COMBS, Assistant Examiner

U.S. Cl. X.R.

77—32.3